United States Patent [19]

Gould

[11] 4,061,827

[45] Dec. 6, 1977

[54] FIBRES

[75] Inventor: Jack Gould, Harrogate, England

[73] Assignee: Imperial Chemical Industries Limited, London, England

[21] Appl. No.: 662,684

[22] Filed: Mar. 1, 1976

[30] Foreign Application Priority Data

Mar. 3, 1975 United Kingdom ................. 8728/75

[51] Int. Cl.$^2$ .......................... B32B 5/16; H05B 3/10; H05B 3/18

[52] U.S. Cl. .................................... 428/368; 219/553; 338/7; 338/225; 428/244; 428/367; 428/372; 428/375; 428/373; 427/122; 427/121; 427/180; 252/511; 29/611

[58] Field of Search ............... 428/368, 367, 244, 379, 428/381, 372, 373, 375, 384, 389; 338/334, 7; 219/553; 252/511; 29/611; 427/122, 121, 180

[56] References Cited

U.S. PATENT DOCUMENTS

| | | | |
|---|---|---|---|
| 3,247,020 | 4/1966 | Shuluer | 428/368 |
| 3,412,358 | 11/1968 | Hummel | 252/511 |
| 3,669,736 | 6/1972 | Fujiwara | 428/368 |
| 3,817,783 | 6/1974 | Verne | 428/368 |
| 3,823,035 | 7/1974 | Sanders | 428/368 |
| 3,861,029 | 1/1975 | Smith-Johannsen | 338/214 |
| 3,914,363 | 10/1975 | Bedard | 338/214 |

FOREIGN PATENT DOCUMENTS

| | | | |
|---|---|---|---|
| 2,251,071 | 4/1973 | Germany. | |
| 1,204,395 | 9/1970 | United Kingdom | 219/553 |
| 1,417,394 | 12/1975 | United Kingdom. | |

*Primary Examiner*—Ellis Robinson

*Attorney, Agent, or Firm*—Cushman, Darby & Cushman

[57] ABSTRACT

An electrically conductive fibre formed from a thermoplastic organic polymer and having a zero or positive temperature coefficient of resistance. It is produced by the sequential steps of embedding and/or dispersing electrically conductive carbon particles into an outer region of the fibre, removing at least some of any free, unadhered carbon particles, if any are present, from the surface of the fibre by washing, and heating the fibre to a temperature whereby its temperature coefficient of resistance becomes zero or is converted to a positive value.

10 Claims, No Drawings

FIBRES

The present invention relates to a process for modifying the electrical properties of electrically conductive fibres.

By the term "fibre" as used throughout the specification, is meant both continuous filament(s) and staple fibre(s) produced from thermoplastic organic polymers such as for example, polyesters, including polyethylene terephthalate, polyamides, including nylon-6 and nylon-66, polyacrylonitrile and modified polyacrylonitrile.

It is known to produce electrically conductive fibres by embedding or dispersing electrically conductive particles into the outer region of the fibre. Such fibres may be obtained by the process described in UK Patent Specification No. 1,417,394 in which an oriented conjugate fibre is coated with electrically conductive particles and subsequently heated to embed the particles. By the term "conjugate fibre" is meant a fibre composed of at least two fibre forming polymeric components arranged in distinct zones across the cross-section of the fibre and substantially continuous along the length of the fibre, one of the components having a softening temperature lower than the softening temperature of the other component(s) being located to form at least a portion of the peripheral surface of the fibre.

Alternatively, electrically conductive fibres may be produced by softening the outer surface of a fibre made from a single polymeric component, for example by treating the fibre with a swelling agent, and subsequently embedding and/or dispersing electrically conductive particles into the softened surface. The outer surface of the fibre is finally hardened, for example by removing the swelling agent, whereby the particles become trapped.

A very cheap and convenient form of electrically conductive particles suitable for embedding by either process comprises electrically conductive carbon particles. Electrically conductive fibres produced using such particles have an electrical conductivity sufficiently high to enable them to be used as heating elements, such as, for example, those described in UK Patent Specification No. 1,417,394 and our co-pending UK Patent Specification No. 36,936/74. However, heaters utilising this particular type of fibre have a negative temperature coefficient of resistance, that is, the resistance of the heater decreases as the temperature rises. This means that as the temperature of the heater rises, more and more electric current is allowed to flow through the heater causing its temperature to increase still further. Therefore, in order that such an unstable and unsafe condition does not develop, the electrical current supplied to the heater must be controlled by a suitable controller such as a rheostat or thermostat.

It has now been found possible to modify the properties of fibres containing electrically conductive particles so that their temperature coefficient of resistance is converted from a negative value to zero, or even to a positive value. Heaters comprising modified fibres having a positive temperature coefficient of resistance are of particular value, since the electrical current capable of flowing through the heater decreases as the temperature increases. Such heaters may be operated without a controller since they have a maximum heat output which can be predetermined by the amount of electrically conductive carbon embedded into the fibres.

Therefore, according to one aspect of the present invention, there is provided an electrically conductive fibre, formed from a thermoplastic organic polymer, in which the electrical conductivity is due to electrically conductive carbon particles embedded and/or dispersed in an outer region of the fibre, the fibre having a zero or positive temperature coefficient of resistance.

According to another aspect of the present invention, a process for producing an electrically conductive fibre, formed from a thermoplastic organic polymer, comprises the sequential steps of embedding and/or dispersing electrically conductive carbon particles into an outer region of the fibre, removing an amount of free particles, if any are present, from the fibre surface, and heating the fibre to a temperature whereby its temperature coefficient of resistance becomes zero or is converted to a positive value.

Preferably the electrically conductive fibre has a positive temperature coefficient of resistance, and desirably a value of at least 0.00018 ohms per ohm per degree Centigrade.

By the term "free particles" is meant those carbon particles which are not attached or adhered to the surface of the fibre after the step of embedding and/or dispersing. It has been found that if a large amount of such particles is present on the surface of the fibre, it is impossible to alter the temperature coefficient of resistance of the fibre whatever temperature it is heated to. Generally, the lower the amount of free particles present, the lower the temperature to which the fibre must be heated to alter its temperature coefficient of resistance. Therefore, if the first step of embedding and/or dispersing results in an amount of free particles lying on the surface of the fibre, the second step must reduce the amount to a level so that heating the fibre in the third step will result in the desired change of the temperature coefficient of resistance.

The free particles may be removed from the surface of the fibre by any convenient means such as, for example, mechanical working of the fibre by vibration. Preferably the fibre is washed, especially in water. Wetting agents and detergents may be used in conjunction with the water.

The step of embedding and/or dispersing the carbon particles into an outer region of the fibre may be by any suitable means, such as, for example, applying the particles to the fibre after its surface has been softened by treatment with a swelling agent, or, where the fibre is of the conjugate type, the process described in UK Patent Specification No. 1,417,394 may be used. The fibre may be combined with other fibres in which, because of their composition, the carbon particles do not become embedded and/or dispersed by the process.

As mentioned above, the temperature to which the fibre must be heated in the third step is controlled by the amount of free particles on the surface of the fibre. Where the fibre is of the conjugate type and is impregnated with particles according to the process described in UK Patent Specification No. 1,417,394, it may be necessary to reheat the fibre to a temperature corresponding to the impregnation temperature, although it may be possible to use lower temperatures when small amounts of free carbon particles are present. During the heating step, the electrical resistance of the fibre decreases as the temperature is increased until a point is reached at which the electrical properties of the fibre are modified. On cooling the fibre, its resistance continues to decrease still further, frequently levelling out to a constant value at 100° C and below. Thus, the heat treatment not only modifies the temperature coefficient of resistance, but frequently decreases the resistance of the fibre at ambient temperatures by a factor of 1.5 or more.

The heating step may comprise a single heating/cooling cycle or several such cycles in which case each cycle decreases the resistance of the fibre until a sufficient number of cycles has been completed so that a point is reached at which the temperature coefficient of resistance changes to a positive value.

The process may be used for treating a single fibre, or for treating a bundle of fibres which may be in the form of a yarn, roving, or knitted, woven, or non-woven fabric. The three steps of the process may be operated one immediately after the other, or there may be a lapse of time between the steps during which the fibres may be given an additional treatment.

The invention will be further described with reference to the following examples.

The electrical resistance of the fabrics and fibres of the following examples was measured as follows. A frame was constructed having two parallel conductive clamps, each having a width of 10 cm, spaced 10 cm. apart and mounted on electrically non-conductive, heat resistant blocks attached to a metal base. The jaws gave a good electrical contact when fabric or fibres were mounted in and tensioned between them. The faces of the jaws were cleaned before each test, and leads were attached to the clamps to enable the frame to be lifted into and out of an oven without disturbing the connections.

Electrical resistances were measured using a Honeywell Digitest Model 500 (Regd. Trade Mark). When testing fibers having a low electrical conductivity, the fibres were plied together so that a 10 cm. length tensioned between the clamps had a resistance within the range of the Digitest.

EXAMPLE 1

This example describes the treatment of a non-woven fabric having a weight of 5 oz per sq. meter made by bonding a 1200 dtex yarn of 350 conjugate filaments, the filaments being of the sheath/core (1:1) type in which the core was polyethylene terephthalate and the sheath a 85:15 mole % copolymer of polyethylene terephthalate-adipate. The fabric was passed through an 8% (wt/wt) aqueous slurry of electrically conductive carbon particles (Vulcan XC-72R — Reg. Trade Mark) containing 0.8% (wt/wt) of a dispersing agent (Lomar-D — Reg. Trade Mark). Excess of slurry was removed by mangling and the fabric was dried at 120° C before being heated at 200° C for 5 minutes. Finally, the fabric was washed at 50° C in water containing a wetting agent to remove excess of water, and then dried.

The treated fabric had a resistance of 570 ohms per square at room temperature falling to 534 ohms per square at 100° C. When the fabric was further heated at 200° C for 10 minutes, the temperature coefficient of resistance was converted to a small positive valve, the fabric having a resistance of 446 ohms per square at room temperature rising to 452 ohms per square at 100° C, i.e. a temperature coefficient of resistance of 0.00018 ohms per ohm per ° C.

EXAMPLE 2

A 24 dtex drawn, conjugate filament having a core of nylon-66 and a sheath of a nylon-66/nylon-6 copolymer (70:30 pts. by weight) was passed in succession over three hot plates, (each having a length of 3 feet), the dwell time on each hot plate being 0.2 seconds. The hot plates were maintained at temperatures of 200° C, 220° C and 220° C respectively. Electrically conductive carbon particles (Vulcan XC-72R — Regd. Trade Mark) were sprinkled onto the second hot plate at a rate sufficient to maintain depth of carbon to completely cover the filament.

The resulting filament had a resistance of $10.0 \times 10^6$ ohms per cm. at ambient temperature, and of $9.0 \times 10^6$ at 90° C. After the filament had been washed in water containing a wetting agent to remove excess of carbon particles, followed by drying and subsequent heating to a temperature of 150° C for 10 minutes, the filament had a resistance of $5.5 \times 10^6$ ohms per cm. at ambient temperature which remained unchanged when the temperature was raised to 100° C., i.e. a zero temperature coefficient of resistance.

EXAMPLE 3

The washed and dried electrically conductive filament of Example 2 was plied to give a yarn of approximately 3000 dtex. At temperatures to 100° C the yarn had a negative temperature coefficient of resistance of 0.00125 ohms per ohm per degree Centigrade. The yarn was then heated to 140° C for 10 minutes and then cooled which resulted in the yarn having a positive temperature coefficient of resistance of 0.0015 ohms per ohm per degree Centigrade up to 100° C.

EXAMPLE 4

A 3000 dtex, 147 filament yarn was made by plying together nylon filaments having finely-divided, electrically conductive particles uniformly suffused as an independent phase in an annular region located at the periphery of the filament and extending the entire length thereof. Such filaments are sold under the name of Zefstat Type F901 by Dow Badische Company.

The yarn had a negative temperature coefficient of resistance of 0.00091 ohms per ohm per ° C up to 100° C. After heating at 140° C for 10 minutes, the yarn had a positive temperature coefficient of resistance of 0.00026 ohms per ohm per ° C.

EXAMPLE 5

A tape was woven in which the warp was constructed of non-electrically non-conductive glass fibre yarns except those forming the selvedge which were fine copper wires, and the weft was formed of 838 dtex 36 filament electrically conductive yarn of the type described in Example 2. A sample of the tape had a negative temperature coefficient of resistance of 0.00126 ohms per ohm per ° C over the range 25° to 100° C, measured across the copper warps. Heating a sample of the tape at 150° C for 10 minutes caused the temperature coefficient of resistance measured up to 100° C to become positive with a value of 0.00081 ohms per ohm per ° C.

COMPARATIVE EXAMPLE

This example shows that the negative temperature coefficient of resistance of an electrically conductive fibre in which the electrical conductivity is due to the coating of fibres with a resin containing electrically conductive carbon particles, cannot be converted into a positive value on heating.

A sample of glass fibre fabric in which the fibres were made electrically conductive by coating with a phenolic type resin loaded with electrically conductive carbon particles (sold by Ferrotrack Ltd) had a negative temperature coefficient of resistance of 0.011 ohms per ohm per ° C. over the temperature range of 25° to 100° C. Repeated heating of the fabric at temperatures up to 200° C had no measurable effect on the temperature coefficient of resistance.

What we claim is:

1. An improved electrically conductive fibre, formed from a thermoplastic organic polymer, in which the electrical conductivity is due to electrically conductive carbon particles penetrating an outer region of the fibre, wherein the improvement comprises the fibre having a zero or positive temperature coefficient of resistance.

2. An improved electrically conductive fibre according to claim 1 wherein the fibre has a positive temperature coefficient of resistance of at least 0.00018 ohms per ohm per degree Centigrade.

3. An improved electrically conductive fibre according to claim 1 wherein the fibre is composed of at least two fibre forming polymeric components arranged in distinct zones across the cross-section of the fibre and substantially continuous along the length of the fibre, one of the components having a softening temperature lower than the softening temperature of the other component(s) being located to form at least a portion of the peripheral surface of the fibre.

4. An electrically conductive fibre composed of at least two fibre forming, thermoplastic organic polymers arranged in distinct zones across the cross-section of the fibre and substantially continuous along the length of the fibre, one of the polymers having a softening temperature lower than the softening temperature of the other polymer(s) being located to form at least a portion of the peripheral surface of the fibre and having electrically conductive carbon particles penetrating the peripheral surface of the component of lower softening temperature, the fibre having a positive temperature coefficient of resistance of at least 0.00018 ohms per ohm per degree Centigrade.

5. An electric heater wherein the heating element comprises an electrically conductive fibre according to claim 1.

6. An improved process for producing an electrically conductive fibre comprising causing electrically conductive carbon particles to penetrate an outer region of a fibre formed from a thermoplastic organic polymer to produce an electrically conductive fibre having a negative temperature coefficient of resistance, wherein the improvement comprises washing the carbon containing electrically conductive fibre in water and subsequently heating the fibre to a temperature whereby its temperature coefficient of resistance is converted to a positive value.

7. The improved conductive fibre of claim 1, wherein said polymer is a polyester, polyamide, polyacrylonitrile or modified polyacrylonitrile.

8. An improved process for producing an electrically conductive fibre comprising causing electrically conductive carbon particles to penetrate an outer region of a fibre formed from a thermoplastic organic polymer to produce an electrically conductive fibre having a defined ambient specific electrical resistance and a negative temperature coefficient of resistance, wherein the improvement comprises washing the carbon containing electrically conductive fibre in water and subsequently heating the fibre to a temperature at which its temperature coefficient of resistance is converted from a negative value to zero or to a positive value, and cooling the fibre whereby its ambient specific electrical resistance is reduced to a value below the said defined ambient specific electrical resistance.

9. An improved process for making an electrically conductive fibre comprising coating a drawn fibre made from at least one thermoplastic organic polymer with electrically conductive carbon particles and softening a layer integral with the fibre, and located so as to form at least a portion of the peripheral surface of the fibre, whereby the particles are caused to penetrate into the surface layer to produce an electrically conductive fibre having a negative temperature coefficient of resistance, wherein the improvement comprises washing the carbon containing electrically conductive fibre in water and subsequently heating the fibre to a temperature sufficient to resoften the surface layer of the fibre containing the carbon particles to convert the temperature coefficient of resistance of the fibre to zero or a positive value.

10. An improved process for making an electrically conductive conjugate fibre wherein a conjugate fibre comprising at least two fibre forming thermoplastic organic polymeric components arranged in distinct zones across the cross-section of said fibre, a first component having a lower melting point than the second component and being located so as to form at least a portion of the peripheral surface of said fibre, is coated with electrically-conductive carbon particles at an elevated temperature which is below the melting point of the second component, sufficient to cause said particles to penetrate into an outer surface layer of said first component to produce an electrically conductive fibre having a negative temperature coefficient of resistance, wherein the improvement comprises washing the carbon containing electrically conductive fibre in water and subsequently reheating the fibre to resoften the surface layer of the fibre containing the carbon particles to convert the temperature coefficient of the fibre to zero or a positive value.

* * * * *